United States Patent
Sharma (10) Patent No.: US 8,802,589 B2
(45) Date of Patent: *Aug. 12, 2014

(54) POROUS TITANIUM DIOXIDE COATINGS AND METHODS OF FORMING POROUS TITANIUM DIOXIDE COATINGS HAVING IMPROVED PHOTOCATALYTIC ACTIVITY

(75) Inventor: Pramod K. Sharma, Ann Arbor, MI (US)

(73) Assignee: Guardian Industries Corp., Auburn Hills, MI (US)

(*) Notice: Subject to any disclaimer, the term of this patent is extended or adjusted under 35 U.S.C. 154(b) by 442 days.

This patent is subject to a terminal disclaimer.

(21) Appl. No.: 12/914,102

(22) Filed: Oct. 28, 2010

(65) Prior Publication Data

US 2011/0045970 A1    Feb. 24, 2011

Related U.S. Application Data

(63) Continuation of application No. 12/207,359, filed on Sep. 9, 2008, now Pat. No. 7,846,866.

(51) Int. Cl.
B01J 21/06    (2006.01)

(52) U.S. Cl.
USPC .......................................................... 502/350

(58) Field of Classification Search
None
See application file for complete search history.

(56) References Cited

U.S. PATENT DOCUMENTS

| | | | |
|---|---|---|---|
| 3,573,470 A | 4/1971 | Haley | |
| 4,504,888 A | 3/1985 | Rosenthal | |
| 5,196,088 A | 3/1993 | Soda | |
| 5,332,618 A | 7/1994 | Austin | |
| 5,854,169 A | 12/1998 | Heller et al. | |
| 5,912,045 A | 6/1999 | Eisenhammer et al. | |
| 5,950,106 A | 9/1999 | May et al. | |
| 5,981,425 A | 11/1999 | Taoda et al. | |
| 6,013,372 A * | 1/2000 | Hayakawa et al. | 428/411.1 |
| 6,054,227 A | 4/2000 | Greenberg et al. | |
| 6,071,606 A | 6/2000 | Yamazaki et al. | |
| 6,103,363 A | 8/2000 | Boire et al. | |
| 6,277,169 B1 | 8/2001 | Hampden-Smith et al. | |
| 6,284,377 B1 | 9/2001 | Veerasamy | |
| 6,344,242 B1 | 2/2002 | Stolk et al. | |

(Continued)

FOREIGN PATENT DOCUMENTS

EP    1 205 243 A1    5/2002
EP    1 316 532 A1    6/2003

(Continued)

OTHER PUBLICATIONS

"Synthesis of TiO2 porous thin films by polyethylene glycol templating and chemistry of the process." S.J. Bu, et al. Journal of the European Ceramic Society, vol. 25 (2005), pp. 673-679.*

(Continued)

*Primary Examiner* — Melvin C Mayes
*Assistant Examiner* — Douglas Call
(74) *Attorney, Agent, or Firm* — Jones Robb, PLLC (57) ABSTRACT

Methods for forming porous anatase titanium dioxide coatings are disclosed. Sol-gel compositions are prepared having at least one porosity agent, are applied to a substrate, and at least one porosity agent is removed. Porous anatase titanium dioxide coatings having at least one of improved antimicrobial properties, self-cleaning properties, hydrophilicity, and/or temperability are also disclosed. Substrates comprising such coatings are also disclosed.

15 Claims, 3 Drawing Sheets

(56) References Cited

U.S. PATENT DOCUMENTS

| | | | |
|---|---|---|---|
| 6,362,121 | B1 | 3/2002 | Choppin et al. |
| 6,420,437 | B1 | 7/2002 | Mori et al. |
| 6,679,978 | B2 | 1/2004 | Johnson et al. |
| 7,049,002 | B2 | 5/2006 | Greenberg et al. |
| 7,144,840 | B2 | 12/2006 | Yeung et al. |
| 7,473,369 | B2 | 1/2009 | Meng et al. |
| 7,605,186 | B2 | 10/2009 | Chung et al. |
| 7,846,866 | B2 | 12/2010 | Sharma |
| 2002/0030188 | A1 | 3/2002 | Hayashi et al. |
| 2002/0150681 | A1 | 10/2002 | Boire et al. |
| 2003/0039843 | A1 | 2/2003 | Johnson et al. |
| 2003/0143437 | A1 | 7/2003 | Ohtsu et al. |
| 2003/0235695 | A1 | 12/2003 | Greenberg et al. |
| 2004/0067849 | A1 | 4/2004 | Tanaka et al. |
| 2006/0019028 | A1* | 1/2006 | Yeung et al. .................. 427/180 |
| 2006/0091079 | A1 | 5/2006 | Meng et al. |
| 2007/0017567 | A1 | 1/2007 | Gronet et al. |
| 2007/0099003 | A1* | 5/2007 | Lee et al. ....................... 428/446 |
| 2007/0146889 | A1 | 6/2007 | Wang et al. |
| 2007/0151482 | A1 | 7/2007 | Im et al. |
| 2008/0020127 | A1 | 1/2008 | Whiteford et al. |
| 2008/0145625 | A1 | 6/2008 | Schumacher et al. |
| 2008/0302448 | A1 | 12/2008 | Frey et al. |
| 2009/0061230 | A1 | 3/2009 | Berkei et al. |
| 2009/0075069 | A1 | 3/2009 | Myli et al. |
| 2009/0214766 | A1 | 8/2009 | Magdassi et al. |
| 2009/0286676 | A1 | 11/2009 | Kim et al. |
| 2011/0045970 | A1 | 2/2011 | Sharma |
| 2011/0076450 | A1 | 3/2011 | Sharma |

FOREIGN PATENT DOCUMENTS

| | | | | |
|---|---|---|---|---|
| GB | 2208874 | A | * 4/1989 | .............. C23C 18/12 |
| JP | 08-099041 | A | 4/1993 | |
| JP | 07100378 | A | 4/1995 | |
| JP | 08-196903 | A | 8/1996 | |
| JP | 11-228865 | A | 8/1999 | |
| JP | 2001-286766 | A | 10/2001 | |
| JP | 2004-001400 | | 1/2004 | |
| JP | 2004-092163 | A | 3/2004 | |
| JP | 2006-198466 | A | 8/2006 | |
| KR | 10-2004-0024582 | A | 3/2004 | |
| KR | 10-0421243 | B1 | 3/2004 | |
| KR | 10-0541750 | B1 | 1/2006 | |
| KR | 10-0727579 | B1 | 6/2007 | |
| KR | 10-0753055 | B1 | 8/2007 | |
| KR | 10-2008-0030981 | A | 3/2008 | |
| WO | WO 97/24471 | | 7/1997 | |
| WO | WO 02/06159 | A1 | 1/2002 | |
| WO | WO 03/009061 | A2 | 1/2003 | |
| WO | WO 2005/105332 | A1 | 11/2005 | |
| WO | WO 2007/107792 | A1 | 9/2007 | |
| WO | WO 2007/117332 | A2 | 10/2007 | |
| WO | WO 2007/147399 | | 12/2007 | |
| WO | WO 2010/028109 | A1 | 3/2010 | |
| WO | WO 2010/030550 | A3 | 3/2010 | |
| WO | WO 2010/030551 | A1 | 3/2010 | |
| WO | WO 2010/030552 | A2 | 3/2010 | |
| WO | WO 2010/062433 | A1 | 6/2010 | |
| WO | WO 2011/041218 | A2 | 4/2011 | |

OTHER PUBLICATIONS

Titanium Dioxide—Chemical and Technical Assessment Titanium Dioxide (CTA) 2006, pp. 1-8 Paul M. Kuznesof and M.V. Rao.*
International Search Report in PCT/US2009/0055823 having a mailing date of Feb. 9, 2010.
Written Opinion of the International Searching Authority in PCT/US2009/0055823.
International Search Report in PCT/US2009/0055824 having a mailing date of Apr. 12, 2010.
Written Opinion of the International Searching Authority in PCT/US2009/0055824.
International Search Report in PCT/US2009/0055826 having a mailing date of Feb. 9, 2010.
Written Opinion of the International Searching Authority in PCT/US2009/0055826.
J. Nelson et al., "Photoconductivity and charge trapping in porous nanocrystalline titanium dioxide," *Journal of Photochemistry and Photobiology A: Chemistry*, 148 (2002) 25-31.
T. Watanabe et al., "Photocatalytic activity and photoinduced hydrophilicity of titanium dioxide coated glass," *Thin Solid Films*, 351 (1999) 260-263.
N. Sakai et al., "Effect of Ultrasonic Treatment on Highly Hydrophilic $TiO_2$ Surfaces," *Langmuir*, 1998, 14, 5918-5920.
Y. C. Lee et al, "Photocatalysis and hydrophilicity of doped $TiO_2$ thin films," *Journal of Colloid and Interface Science*, 267, (2003) 127-131.
S. V. Manorama et al., "Photostabilization of dye on anatase titania nanoparticles by polymer capping," *Journal of Physics and Chemistry of Solids*, 63 (2002) 135-143.
A. Conde-Gallardo et al., "$TiO_2$ anatase thin films deposited by spray pyrolysis of an aerosol of titanium diisopropoxide," *Thin Solid Films*, 473 (2005) 68-73.
K.-H. Haas et al, "Functionalized coatings based on inorganic-organic polymers (ORMOCER® s) and their combination with vapor deposited inorganic thin films," *Surface and Coatings Technology*, 111 (1999) 72-79.
R. van Grieken et al., Synthesis of size-controlled silica-supported $TiO_2$ photocatalysts, *Journal of Photochemistry and Photobiology A: Chemistry*, 148 (2002) 315-322.
Co-pending U.S. Appl. No. 12/207,235, filed Sep. 9, 2008.
Co-pending U.S. Appl. No. 12/207,167, filed Sep. 9, 2008.
Co-pending U.S. Appl. No. 12/263,968, filed Nov. 3, 2008.
Co-pending U.S. Appl. No. 12/569,177, filed Sep. 29, 2009.
Office Action dated Apr. 15, 2009 from U.S. Appl. No. 12/207,359.
Office Action dated Sep. 30, 2009 from U.S. Appl. No. 12/207,359.
Office Action dated Apr. 9, 2009 from U.S. Appl. No. 12/207,235.
Office Action dated Nov. 12, 2009 from U.S. Appl. No. 12/207,235.
Office Action dated Apr. 12, 2010 from U.S. Appl. No. 12/207,235.
Office Action dated Dec. 3, 2010 from U.S. Appl. No. 12/207,235.
Co-pending U.S. Appl. No. 12/207,076, filed Sep. 9, 2008.
Co-pending U.S. Appl. No. 12/263,991, filed Nov. 3, 2008.
Co-pending U.S. Appl. No. 12/207,359, filed Sep. 9, 2008.
Aubry, E. et al., Poisoning prevention of $TiO_2$ photocatalyst coatings sputtered on soda-lime glass intercalation of $SiN_x$ diffusion barriers, *Surface and Coatings Technology*, 201 (2007) pp. 7706-7712.
He, C. et al., Influence of silver doping on the photocatalytic activity of titania films, *Applied Surface Science*, 200 (2002), pp. 239-247.
Imai, H. et al., "Preparation of Porous Anatase Coating from Sol-Gel-Derived Titanium Dioxide and Titanium Dixoide-Silica by Water-Vapor Exposure", *J. Am. Ceram. Soc.*, 82 (9) (1999), pp. 2301-2304.
Jung, K.Y. et al., "Photoactivity of $SiO_2/TiO_2$ and $ZrO_2/TiO_2$ mixed oxides prepared by sol-gel method", *Materials Letters*, 58 (2004) pp. 2897-2900.
Page, K. et al., "Titania and silver-titania composite films on glass-potent antimicrobial coatings", *J. Mater. Chem.*, 17 (2007), pp. 95-104.
Seery, M.K. et al., "Silver doped titanium dioxide nanomaterials for enhanced visible light photocatalysis", *Journal of Photochemistry and Photobiology A: Chemistry*, 189 (2007) pp. 258-263.
Advisory Action, U.S. Appl. No. 12/569,177, dated Nov. 30, 2012.
Advisory Action, U.S. Appl. No. 12/263,968, dated Feb. 16, 2012.
Advisory Action, U.S. Appl. No. 12/207,235, dated Jun. 27, 2012.
International Search Report, Application No. PCT/US2009/055827, dated Apr. 20, 2010.
International Search Report, Application No. PCT/US2009/055829, dated Mar. 10, 2010.
Notice of Allowance, U.S. Appl. No. 12/207,359, dated Apr. 12, 2010.
Notice of Allowance, U.S. Appl. No. 12/207,359, dated Jul. 29, 2010.
Notice of Allowance, U.S. Appl. No. 12/207,076, dated Oct. 17, 2012.
Office Action, U.S. Appl. No. 12/207,235, dated Apr. 18, 2012.
Office Action, U.S. Appl. No. 12/263,991, dated Apr. 20, 2011.

(56) References Cited

OTHER PUBLICATIONS

Office Action, U.S. Appl. No. 12/207,076, dated Apr. 7, 2011.
Office Action, U.S. Appl. No. 12/207,235, dated Aug. 22, 2012.
Office Action, U.S. Appl. No. 12/263,968, dated Feb. 17, 2011.
Office Action, U.S. Appl. No. 12/569,177, dated Jul. 16, 2012.
Office Action, U.S. Appl. No. 12/207,235, dated Jun. 16, 2011.
Office Action, U.S. Appl. No. 12/207,167, dated Jun. 17, 2011.
Office Action, U.S. Appl. No. 12/569,177, dated Mar. 14, 2012.
Office Action, U.S. Appl. No. 12/207,167, dated Nov. 21, 2011.
Office Action, U.S. Appl. No. 12/263,991, dated Oct. 11, 2011.
Office Action, U.S. Appl. No. 12/207,235, dated Oct. 5, 2011.
Office Action, U.S. Appl. No. 12/207,076, dated Oct. 7, 2011.
Office Action, U.S. Appl. No. 12/263,968, dated Sep. 2, 2011.
Written Opinion, Application No. PCT/US2009/055827, dated Apr. 20, 2010.
Written Opinion, Application No. PCT/US2009/055829, dated Mar. 10, 2010.
European Search Report, Application No. 09813466.1, dated Feb. 6, 2012.
European Search Report, Application No. 09813467.9, dated Oct. 21, 2011.
International Search Report and Written Opinion, Application No. PCT/US2010/050118, dated Jun. 23, 2011.
Office Action, U.S. Appl. No. 12/263,968, dated Dec. 20, 2012.
Office Action, U.S. Appl. No. 12/263,991, dated Feb. 4, 2013.
Office Action, U.S. Appl. No. 12/207,235, dated May 6, 2013.
Nissan Chemical, Organosilicasol information sheet, 2007.
M.M. Goldberg, "Raw Materials and Intermediate Products for Paint Materials," from "Chemistry," Moscow, 1978, pp. 277-281.
Notice of Allowance, U.S. Appl. No. 12/263,968, dated May 28, 2013.
Office Action, U.S. Appl. No. 12/263,991, dated May 21, 2013.
Office Action, U.S. Appl. No. 12/569,177, dated Aug. 1, 2013.

\* cited by examiner

POROUS TITANIUM DIOXIDE COATINGS AND METHODS OF FORMING POROUS TITANIUM DIOXIDE COATINGS HAVING IMPROVED PHOTOCATALYTIC ACTIVITY

This is a continuation of application Ser. No. 12/207,359, parent 2010/0062931 now U.S. Pat. No. 7,846,866, filed Sep. 9, 2008 which is incorporated herein by reference.

FIELD

The present invention relates generally to porous titanium dioxide coatings and methods of forming porous titanium dioxide coatings having improved photocatalytic activity, such as by increasing porosity.

BACKGROUND

Titanium dioxide ($TiO_2$, also know as titania) has been widely studied because of its potential photocatalytic applications. Titanium dioxide only absorbs ultraviolet (UV) radiation. When UV light is illuminated on titanium dioxide, electron-hole pairs are generated. Electrons are generated in the conduction band and holes are generated in the valence band. The electron and hole pairs reduce and oxidize, respectively, adsorbates on the surface of the titanium dioxide, producing radical species such as $OH^-$ and $O_2^-$. Such radicals may decompose certain organic compounds or pollutants, for example by turning them into non-harmful inorganic compounds. As a result, titanium dioxide coatings have found use in antimicrobial and self-cleaning coatings.

To activate the titanium dioxide to photogenerate these electron-hole pairs (i.e. photocatalytic activity), and thus to provide the titanium dioxide with antimicrobial and/or self-cleaning properties, titanium dioxide must be regularly dosed with photons of energy greater than or equal to 3.0 eV (i.e., radiation having a wavelength less than 413 nm). Depending on variables such as the structure, ingredients, and texture of titanium dioxide coatings, for example, dosing may takes several hours, such as, for example, 6 hours or more. Antimicrobial titanium dioxide coatings, therefore, must generally be exposed to UV radiation for at least 6 hours before achieving the full photocatalytic effect.

Efforts have been made to extend the energy absorption of titanium dioxide to visible light and to improve the photocatalytic activity of titanium dioxide. For example, foreign metallic elements such as silver can be added. This may, for example, aid electron-hole separation as the silver can serve as an electron trap, and can facilitate electron excitation by creating a local electric field.

Furthermore, titanium dioxide also has been shown to exhibit highly hydrophilic properties when exposed to UV radiation. Such hydrophilicity may be beneficial in certain embodiments, such as, for example, certain coating embodiments. Without wishing to be limited in theory, it is believed that the photoinduced hydrophilicity is a result of photocatalytic splitting of water by the mechanism of the photocatalytic activity of the titanium dioxide, i.e., by the photogenerated electron-hole pairs. When exposed to UV radiation, the water contact angle of titanium dioxide coatings approaches 0°, i.e., superhydrophilicity.

Current coating methods involving titanium dioxide often result in a disadvantageous loss of hydrophilicity and/or photocatalytic activity (and thus antimicrobial and/or self-cleaning properties) of the titanium dioxide. This may be due to formation of different phases of the titanium dioxide during the coating process. For example, anatase titanium dioxide typically transforms to rutile phase titanium dioxide when heated at temperatures greater than 600° C., such as may be used during the coating process. The rutile phase has less desirable surface coating properties than the anatase phase, such as, for example, less desirable hydrophilicity and antimicrobial and/or self-cleaning properties.

Current coating methods may also be disadvantageous in that they form coatings that decrease visible light transmission and increase haze when formed on a transparent glass substrate.

There is thus a long-felt need in the industry for methods for forming a titanium dioxide coating having increased photocatalytic activity such as antimicrobial and/or self-cleaning properties and/or hydrophilicity, and/or a reduced dosing time. There is also a long-felt need for anatase titanium dioxide coatings that can be tempered without forming the rutile phase (i.e. increased temperability). In addition, there is a long-felt need for anatase titanium dioxide coatings that allow a maximum amount of visible light to be transmitted with a minimum amount of haze. The invention described herein may, in some embodiments, solve some or all of these of these needs.

SUMMARY

In accordance with various exemplary embodiments of the invention, methods for improving at least one of the hydrophilicity, photocatalytic activity such as antimicrobial and/or self-cleaning properties, and/or temperability of titanium dioxide coatings have now been discovered.

At least one exemplary embodiment of the invention relates to methods for forming porous anatase titanium dioxide coatings in order to improve at least one of photocatalytic activity such as antimicrobial and/or self-cleaning properties, and hydrophilicity of the titanium dioxide coatings. Other exemplary embodiments of the invention relate to methods for forming temperable anatase titanium dioxide coatings.

Exemplary methods comprise, for example, preparing a sol-gel composition, coating a substrate, and then heating the coating to form a porous anatase titanium dioxide coating.

Other exemplary embodiments of the invention relate to porous anatase titanium dioxide coatings. Further exemplary embodiments of the invention relate to temperable porous anatase titanium dioxide coatings. Exemplary embodiments of the invention also include antimicrobial and/or self-cleaning coatings comprising porous anatase titanium coatings. Further embodiments include a substrate coated with a titanium dioxide coating according to various exemplary embodiments of the invention.

As used herein, "increased" or "improved photocatalytic activity" means any decrease in the activation time of, or any increase in the amount of organic material decomposed by, the titanium dioxide coating in a specified period of time when compared to non-porous titanium dioxide coatings. Similarly, "increased" or "improved antimicrobial properties" or "increased" or "improved self-cleaning properties" likewise mean any increase in the amount of organic material decomposed by the titanium dioxide coating in a specified period of time when compared to non-porous titanium dioxide coatings.

Throughout this disclosure, the terms "photocatalytic activity," "antimicrobial properties," and/or "self-cleaning properties" may be used interchangeably to convey that the antimicrobial and/or self-cleaning properties of the titanium dioxide coatings are a result of the photocatalytic activity of the coatings.

As used herein, "activation time" means the time required for a titanium dioxide coating illuminated with UV radiation to decompose a specified percentage of organic material over a period of time.

As used herein, the term "temperable" means a titanium dioxide coating that may be heated to a temperature sufficient to temper a substrate on which it is formed without forming rutile phase titanium dioxide.

As used herein, "increased" or "improved hydrophilicity" means any decrease in the water contact angle when compared to non-porous titanium dioxide coatings. The water contact angle is a measure of the angle between water and the surface of a material. A smaller water contact angle indicates a material that is more hydrophilic than a material with a higher water contact angle. Water droplets on more hydrophilic surfaces tend to spread out or flatten, whereas on less hydrophilic surfaces water tends to bead up or form droplets which are more spherical in shape, and the water contact angle of those surfaces is generally greater.

As used herein, "porosity agent" means any chemical compound capable of forming a sol-gel composition with titanium dioxide and which forms porous titanium dioxide. By way of example only, a chemical compound is considered a porosity agent according to the present disclosure when a sol-gel composition which is heated or sintered to cause the porosity agent to burn off or otherwise depart from the composition leaves behind porous titanium dioxide.

As used herein, the term "sol-gel composition" means a chemical solution comprising a titanium compound and a porosity agent as a dispersion or colloid within the chemical solution. The titanium compound forms a polymer with the porosity agent dispersed therein, which upon sintering, forms a porous titanium dioxide material.

As described herein, the invention relates to porous anatase titanium dioxide coatings and methods of forming porous anatase titanium dioxide coatings. In the following description, certain aspects and embodiments will become evident. It should be understood that the invention, in its broadest sense, could be practiced without having one or more features of these aspects and embodiments. It should be understood that these aspects and embodiments are merely exemplary and explanatory, and are not restrictive of the invention as claimed.

BRIEF DESCRIPTION OF THE DRAWINGS

The following figures, which are described below and which are incorporated in and constitute a part of the specification, illustrate exemplary embodiments of the invention and are not to be considered limiting of the scope of the invention, for the invention may admit to other equally effective embodiments.

DESCRIPTION OF EXEMPLARY EMBODIMENTS

Reference will now be made to various exemplary embodiments of the invention, examples of which are illustrated in the accompanying figures. However, these various exemplary embodiments are not intended to limit the disclosure, but rather, numerous specific details are set forth in order to provide a thorough understanding of the invention. However, it will be apparent to one skilled in the art that the invention may be practiced without some or all of these specific details, and the disclosure is intended to cover alternatives, modifications, and equivalents. For example, well-known features and/or process steps may not have been described in detail so as not to unnecessarily obscure the invention.

The present invention contemplates exemplary methods for forming porous anatase titanium dioxide coatings in order to improve at least one of photocatalytic activity (and thus antimicrobial and/or self-cleaning properties), hydrophilicity, and/or temperability of the coating.

While not wishing to be bound by theory, it is believed that the increased porosity of the titanium dioxide coating leads to a greater surface area. The greater surface area may, for example, lead to a greater number of radicals which form on the porous anatase titanium dioxide coating, which in turn may lead to (1) improved photocatalytic activity such as antimicrobial and/or self-cleaning properties because the number of radicals may be directly related to the amount of surface area available, and/or (2) improved hydrophilicity because the number of radicals which are present and are available to be attracted to the water molecules is greater.

One exemplary method of the invention comprises preparing a sol-gel composition comprising at least one porosity agent, coating a substrate with the sol-gel composition, and heating the coating to remove the at least one porosity agent, leaving behind a porous titanium dioxide coating.

In at least one exemplary embodiment, the sol-gel composition comprises a titanium alkoxide or a titanium chloride. Examples of titanium alkoxides which may be used in sol-gel compositions according to the present invention include, but are not limited to, titanium n-butoxide, titanium tetra-iso-butoxide (TTIB), titanium isopropoxide, and titanium ethoxide. In at least one embodiment, the sol-gel composition comprises titanium tetra-iso-butoxide.

In at least one embodiment, the sol-gel composition further comprises a surfactant, which may improve the coating process. Examples of surfactants which may be used in accordance with the present invention include, but are not limited to, non-ionic surfactants such as alkyl polysaccharides, alkylamine ethoxylates, castor oil ethoxylates, ceto-stearyl alcohol ethoxylates, decyl alcohol ethoxylates, and ethylene glycol esters.

Various exemplary methods in accordance with the invention may increase porosity of the titanium dioxide coatings and/or may improve at least one of hydrophilicity and photocatalytic activity such as antimicrobial and/or self-cleaning properties of the coatings.

The present invention contemplates, in one exemplary embodiment, forming a porous anatase titanium dioxide coating comprising preparing a titanium dioxide sol-gel composition comprising titanium dioxide and at least one porosity agent, coating a substrate with the sol-gel composition, and removing the at least one porosity agent, such as by heating the coated substrate at a sufficient temperature to remove the at least one porosity agent.

In exemplary embodiment of the present invention, the at least one porosity agent may be chosen from high molecular weight polymeric materials. Examples of high molecular weight polymeric materials that may be mentioned include, but are not limited to, glycerol ester, gycerols, glycols (such as ethylene glycols, propylene glycol), diols, such as neopentyl glycols, hexane iols, and butane diols, organic acids (such as fumaric acid, maleic acid, phthalic acid, citric acid etc.), polyvinyl alcohol, esters such as polyoxyethylene ester, ethers such as (poly (methyl vinyl)ether, organic polymers such as cellulose, polyacylics, polyvinyl pyrrolidone, polyacrylides, polyvinyl acetates, alkyl polysaccharides, alkylamine ethoxylates, castor oil ethoxylates, ceto-stearyl alcohol ethoxylates, decyl alcohol ethoxylates, and ethylene glycol esters.

In various exemplary embodiments, the at least one porosity agent comprises polyethylene glycol (PEG). In at least one embodiment, the amount of porosity agent, such as PEG, may be chosen to control the level of porosity in the final porous anatase titanium dioxide coatings. In addition, one skilled in the art will appreciate that the final porosity of the anatase titanium dioxide coatings may affect certain properties of the final coatings other than porosity, such as the durability and scratch-resistance. Therefore, the amount of porosity agent may, in certain exemplary embodiments, be selected according to such desired properties of the final porous anatase titanium dioxide coatings. In at least one exemplary embodiment, the sol-gel composition comprises a porosity agent in an amount of at least 5 wt % relative to the total weight of the composition. In at least one further exemplary embodiment, the sol-gel composition may comprise a porosity agent in an amount of at least 10 wt %, such as at least 15 wt % or at least 20 wt %, relative to the total weight of the composition. The desired amount of porosity agent then for any particular embodiment of the invention, is well within the ability of those skilled in the art, requiring no more than routine experimentation.

In various exemplary embodiments, the porous anatase titanium dioxide coatings may be formed on a substrate. Accordingly, substrates coated with a titanium dioxide coating according to various exemplary embodiments of the invention are also contemplated herein. One of skill in the art will readily appreciate the types of substrates which may be coated with exemplary coatings as described herein.

In one exemplary embodiment, the substrate may comprise a glass substrate. In various exemplary embodiments, the glass substrate may be chosen from standard clear glass, such as float glass, or a low iron glass, such as ExtraClear™, UltraWhite™, or Solar glasses available from Guardian Industries.

In at least one embodiment, the substrate, such as glass, is coated with a sol-gel composition, and heated to a temperature sufficient to remove, for example by burning off, the at least one porosity agent. For example, when the at least one porosity agent comprises PEG, the sol-gel substrate may be heated at a temperature of 600° C., 625° C., or greater. One skilled in the art will appreciate that other temperatures may be used and should be chosen such that anatase titanium dioxide is formed. For example, titanium dioxide coatings may be heated at a temperature ranging from about 550° C. to about 650° C. Titanium dioxide coatings may be heated at lower temperatures as well, as long as anatase titanium dioxide is formed. One skilled in the art may choose the temperature and heating time based on, for example, the temperature sufficient to remove the at least one porosity agent, the properties of the desired porous anatase titanium dioxide coating, such as thickness of the coating or thickness of the substrate, etc. For example, a thinner coating may require heating at a lower temperature or for a shorter time than a thicker coating. Similarly, a substrate that is thicker or has lower heat transfer may require a higher temperature or a longer time than a substrate that is thinner or has a high heat transfer. As used herein, the phrase "heated at" a certain temperature means that the oven or furnace is set at the specified temperature. Determination of the appropriate heating time and temperature is well within the ability of those skilled in the art, with no more than routine experimentation.

In at least one embodiment, the substrate may be coated with the sol-gel composition by a method chosen from spin-coating the sol-gel composition on the substrate, spray-coating the sol-gel composition on the substrate, dip-coating the substrate with the sol-gel composition, and any other technique known to those of skill in the art.

Temperable porous anatase titanium dioxide coatings may be formed according to at least one method of the present invention. For example, a porous anatase titanium dioxide coating formed on a glass substrate may be heated at a temperature sufficient to temper the glass substrate without forming the rutile phase of titanium dioxide, i.e., the porous titanium dioxide remains in the anatase phase when the glass substrate is tempered.

The present invention also contemplates, in at least one embodiment, a porous anatase titanium dioxide coating having improved hydrophilicity, such as, for example, when formed on a substrate. For example, the porous anatase titanium dioxide coating may have a water contact angle, when exposed to UV radiation, less than 12°, such as less than 10°, less than 7°, or less than 5°.

In at least one embodiment, the porous anatase titanium dioxide coating may be used as an antimicrobial and/or self-cleaning coating. Accordingly, a substrate having improved antimicrobial and/or self-cleaning properties, coated with a porous anatase titanium dioxide coating according to various embodiments of the invention, can be provided.

In various embodiments, exemplary porous anatase titanium dioxide coatings do not, when heated at a temperature of 600° C., 625° C., or greater, transform to rutile phase titanium dioxide. In this regard, the coatings have improved temperability compared to coatings not according to embodiments of the invention.

In at least one embodiment of the present invention, the methods of the present invention provide a porous anatase titanium dioxide coating which transmits at least 75% of visible light, such as at least 76% or at least 77% of visible light, when formed on a substrate comprising 3.2 mm thick float glass. One skilled in the art will appreciate that the coatings of the present invention may be formed to produce higher or lower visible light transmission depending on the desired attributes. Increasing the visible light transmission of the titanium dioxide coating may decrease the mechanical strength of the coating. Titanium dioxide coatings that transmit less visible light may have greater mechanical strength. These coatings may, for example, be applied to a substrate, such as a glass substrate, to increase the transmission of light through the coated substrate compared to glass substrates coated with coatings not according to the invention.

In at least one embodiment, the methods of the invention provide a porous anatase titanium dioxide coating which reflects less than 26.5% of visible light, such as less than 25.5% or less than 25% of visible light, when formed on a substrate comprising 3.2 mm thick float glass. One skilled in the art will appreciate that the reflection of the porous titanium dioxide coating may be increased or decreased according to the desired properties of the coating. One skilled in the art would appreciate that these changes may adversely affect the coatings, such as, for example, by decreasing the mechanical strength of the coating. These coatings may, for example, be applied to a substrate, such as a glass substrate, to decrease the reflection of light by the coated substrate compared to substrates coated with coatings not according to the invention.

The present invention is further illustrated by the following non-limiting examples, which are provided to further aid those of skill in the art in the appreciation of the invention.

Unless otherwise indicated, all numbers herein, such as those expressing weight percents of ingredients and values for certain physical properties, used in the specification and claims are to be understood as being modified in all instances by the term "about," whether so stated or not. It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, a "wt %" or "weight percent" or "percent by weight" of a component, unless specifically stated to the contrary, is based on the total weight of the composition or article in which the component is included. As used herein, all percentages are by weight unless indicated otherwise.

It is noted that, as used in this specification and the appended claims, the singular forms "a," "an," and "the," include plural referents unless expressly and unequivocally limited to one referent, and vice versa. Thus, by way of example only, reference to "a substrate" can refer to one or more substrates, and reference to "a porous anatase titanium dioxide coating" can refer to one or more porous anatase titanium dioxide coatings. As used herein, the term "include" and its grammatical variants are intended to be non-limiting, such that recitation of items in a list is not to the exclusion of other like items that can be substituted or added to the listed items.

It will be apparent to those skilled in the art that various modifications and variation can be made to the present disclosure without departing from the scope its teachings. Other embodiments of the disclosure will be apparent to those skilled in the art from consideration of the specification and practice of the teachings disclosed herein. It is intended that the embodiments described in the specification be considered as exemplary only.

EXAMPLES

Comparative Example

A titanium dioxide sol was prepared by mixing 6 g of titanium tetra-iso-butoxide (TTIB) in a solution containing 25 g of ethanol and 2 g of nitric acid. The mixture was stirred for 1 hour. The pure titanium dioxide coating was fabricated by spin coating a glass substrate at 700 rpm for 30 seconds. The coating was heat treated in a furnace at 625° C. for 3.5 minutes, resulting in a temperable, pure anatase titanium dioxide coating (i.e., no rutile phase titanium dioxide was formed). The formed anatase titanium dioxide coating had a water contact angle of 19.1°.

The photocatalytic activity of the examples disclosed herein was tested using a stearic acid test that measured the degradation of stearic acid on the anatase titanium dioxide coatings. To perform the stearic acid test, an $8.8 \times 10^{-3}$ M stearic acid/methanol solution was prepared. The stearic acid/methanol solution was spin coated on the surface of the anatase titanium dioxide coating at 2000 rpm for 30 seconds. The stearic acid concentration was measured with a Nicolet 6700 FT-IR spectrometer by integrating the absorption peaks of the stearic acid molecule between 2700 and 3100 $cm^{-1}$.

Figure 1:
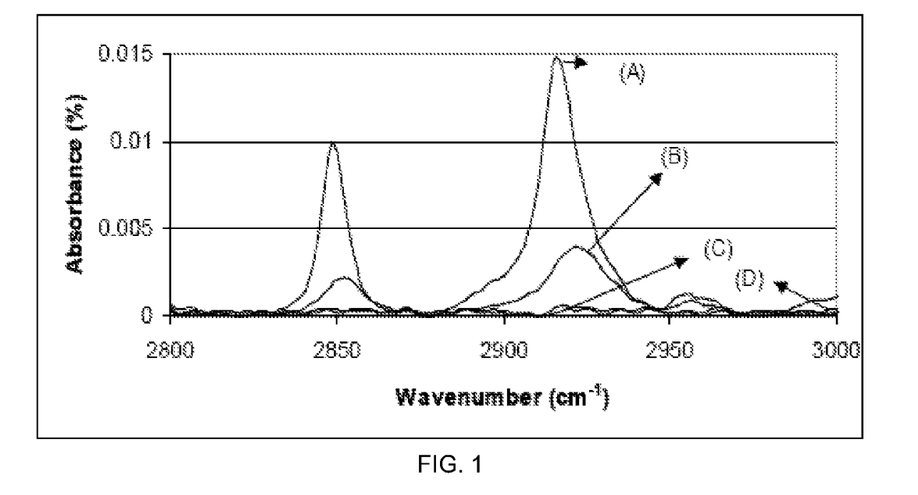
FIG. 1 is an absorbance spectrum of the pure anatase titanium dioxide coating of the Comparative Example at various time intervals of UV illumination.

Stearic acid concentration was then measured at various time intervals of UV illumination of the anatase titanium dioxide coating. Two UV lamps with 1300 μW/cm² and wavelength of 340 nm were used for UV irradiation. FIG. 1 shows the absorbance spectra of the pure anatase titanium dioxide coating of the Comparative Example. In each of the absorbance spectrographs shown in FIGS. 1-5, the spectrographs are labeled after UV illumination for (A) 0 hours, (B) 3 hours, (C) 6 hours, and (D) 21 hours.

As can be seen in FIG. 1, the absorbance peaks for stearic acid left on the coating after exposing the pure anatase titanium dioxide coating to UV illumination for 3 hours were 33.37% and 33.39% of the initial peak size for the peaks at 2920 $cm^{-1}$ and 2850 $cm^{-1}$, respectively. After 21 hours, the stearic acid absorbance peaks were 0.07% and 0.89% for the peaks at 2920 $cm^{-1}$ and 2850 $cm^{-1}$, respectively.

Example 1

The coating of Example 1 was prepared similar to the coating of the Comparative Example except that 5 wt % of PEG was added to the titanium dioxide solution to form a sol-gel. The anatase titanium dioxide coating of Example 1 was coated and heated in the same manner as in the Comparative Example, but the addition of PEG resulted in a temperable, porous, pure anatase phase titanium dioxide coating (i.e., no rutile phase titanium dioxide was formed). The water contact angle of the porous anatase titanium dioxide coating of Example 1 was 15.4°.

Figure 2:
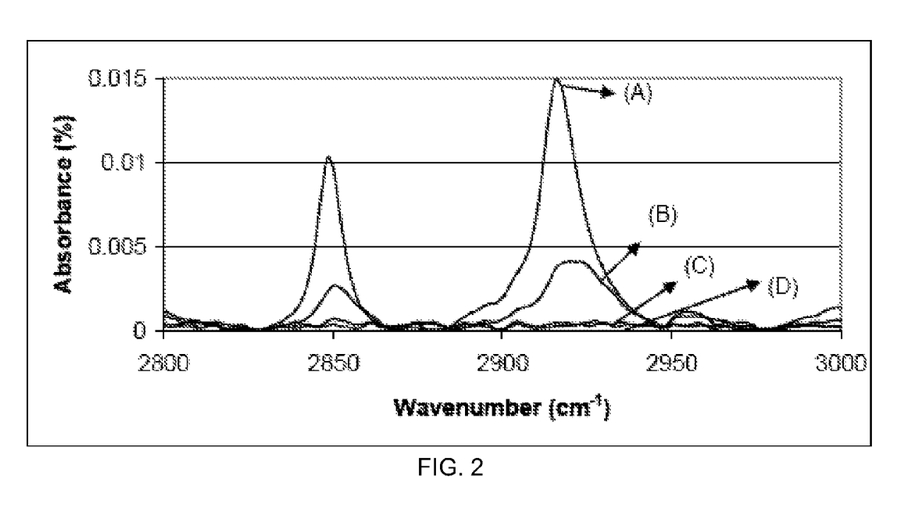
FIG. 2 is an absorbance spectrum of the porous anatase titanium dioxide coating of Example 1 at various time intervals of UV illumination.

FIG. 2 is an absorbance spectrum of the porous anatase titanium dioxide coating of Example 1 at various time intervals of UV illumination. As seen in FIG. 2, the absorbance peaks of stearic acid on the porous anatase titanium dioxide coating of Example 1 after 3 hours of UV illumination were 33.6% and 32.3% of the initial peak size for the peaks at 2920 $cm^{-1}$ and 2850 $cm^{-1}$, respectively. After 21 hours, the stearic acid absorbance peaks of the coating in Example 1 were 0.87% and 1.75% for the peaks at 2920 $cm^{-1}$ and 2850 $cm^{-1}$, respectively.

Example 2

The coating of Example 2 was prepared similar to the coating of the Comparative Example except that 10 wt % of PEG was added to the titanium dioxide solution to form a sol-gel. The anatase titanium dioxide coating of Example 2 was coated and heated in the same manner as in the Comparative Example, but the addition of PEG resulted in a temperable, porous, pure anatase phase titanium dioxide coating (i.e., no rutile phase titanium dioxide was formed). The water contact angle of the porous anatase titanium dioxide coating of Example 2 was 10.6°.

Figure 3:
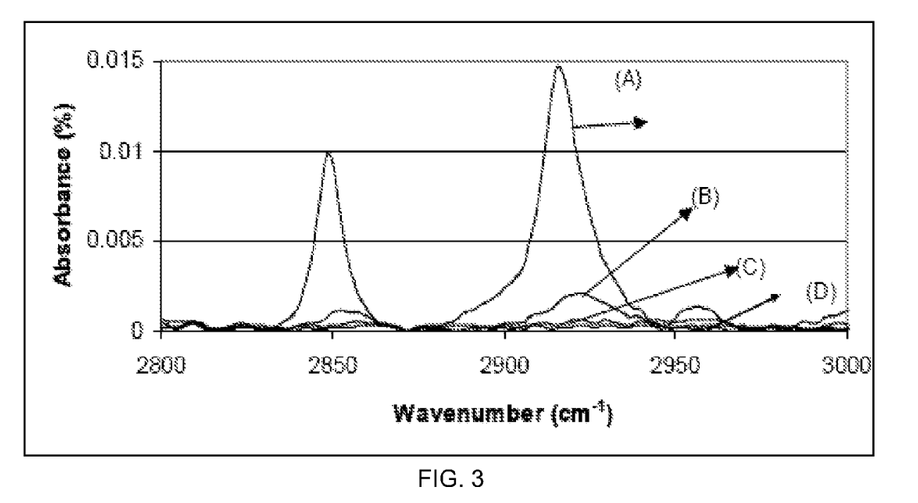
FIG. 3 is an absorbance spectrum of the porous anatase titanium dioxide coating of Example 2 at various time intervals of UV illumination.

FIG. 3 is an absorbance spectrum of the porous anatase titanium dioxide coating of Example 2 at various time intervals of UV illumination. As seen in FIG. 3, the absorbance peaks of stearic acid on the porous anatase titanium dioxide coating of Example 2 after 3 hours of UV illumination were 16.2% and 12.04% of the initial peak size for the peaks at 2920 cm$^{-1}$ and 2850 cm$^{-1}$, respectively. After 21 hours, the stearic acid absorbance peaks of the coating in Example 2 were 2.52% and 2.33% for the peaks at 2920 cm$^{-1}$ and 2850 cm$^{-1}$, respectively.

Example 3

The coating of Example 3 was prepared similar to the coating of the Comparative Example except that 15 wt % of PEG was added to the titanium dioxide solution to form a sol-gel. The anatase titanium dioxide coating of Example 3 was coated and heated in the same manner as in the Comparative Example, but the addition of PEG resulted in a temperable, porous, pure anatase phase titanium dioxide coating (i.e., no rutile phase titanium dioxide was formed). The water contact angle of the porous anatase titanium dioxide coating of Example 3 was 9.4°.

Figure 4:
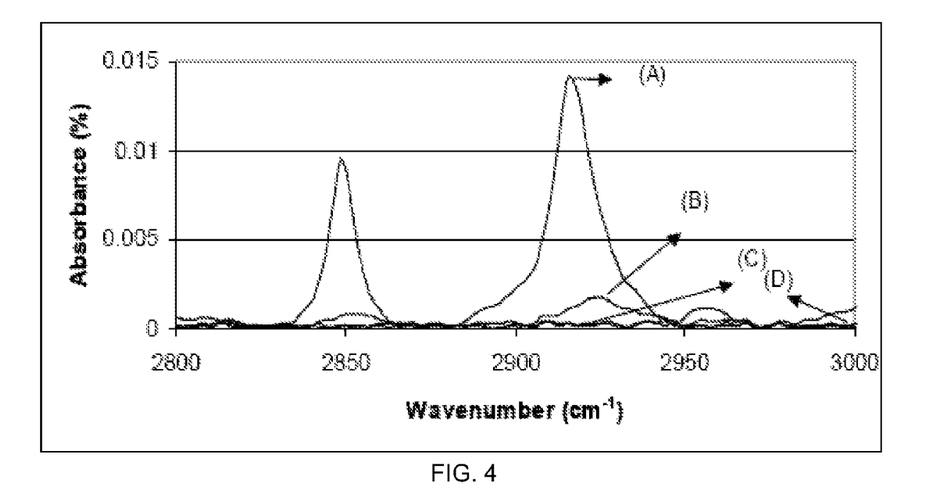
FIG. 4 is an absorbance spectrum of the porous anatase titanium dioxide coating of Example 3 at various time intervals of UV illumination.

FIG. 4 is an absorbance spectrum of the porous anatase titanium dioxide coating of Example 3 at various time intervals of UV illumination. As seen in FIG. 4, the absorbance peaks of stearic acid on the porous anatase titanium dioxide coating of Example 3 after 3 hours of UV illumination were 14.32% and 9.32% of the initial peak size for the peaks at 2920 cm$^{-1}$ and 2850 cm$^{-1}$, respectively. After 21 hours, the stearic acid absorbance peaks of the coating in Example 3 were 0.71% and 1.34% for the peaks at 2920 cm$^{-1}$ and 2850 cm$^{-1}$, respectively.

Example 4

The coating of Example 4 was prepared similar to the coating of the Comparative Example except that 20 wt % of PEG was added to the titanium dioxide solution to form a sol-gel. The anatase titanium dioxide coating of Example 4 was coated and heated in the same manner as in the Comparative Example, but the addition of PEG resulted in a temperable, porous, pure anatase phase titanium dioxide coating (i.e., no rutile phase titanium dioxide was formed). The water contact angle of the porous anatase titanium dioxide coating of Example 4 was 7.26°.

Figure 5:
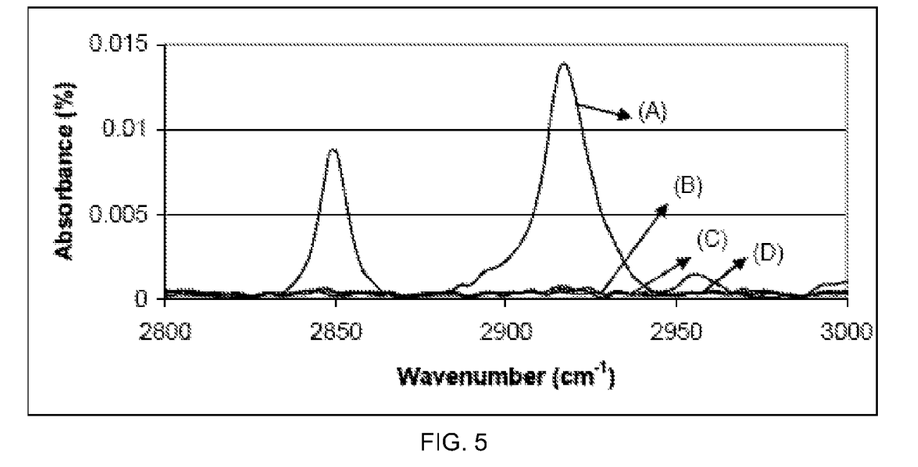
FIG. 5 is an absorbance spectrum of the porous anatase titanium dioxide coating of Example 4 at various time intervals of UV illumination.

FIG. 5 is an absorbance spectrograph of the porous anatase titanium dioxide coating of Example 4 at various time intervals of UV illumination. As seen in FIG. 5, the absorbance peaks of stearic acid on the porous anatase titanium dioxide coating of Example 4 after 3 hours of UV illumination were 2.5% and 3.84% of the initial peak size for the peaks at 2920 cm$^{-1}$ and 2850 cm$^{-1}$, respectively. After 21 hours, the stearic acid absorbance peaks of the coating in Example 4 were 0.6% and 1.1% for the peaks at 2920 cm$^{-1}$ and 2850 cm$^{-1}$, respectively.

The optical properties of the of the anatase titanium dioxide coatings of the Comparative Example and Examples 1-4 are shown in Table 1 below. As can be seen in Table 1, Examples 1-4 disclosing exemplary porous anatase titanium dioxide coatings according to the present invention comprise increased visible light transmission and lower reflectivity (Ref$_{coating}$) at the coating side, as well as a reduction in haze. As can be seen, as porosity increases, there is a corresponding increase in the amount of visible light that is transmitted, which may be a desirable property for a variety of uses, such as in coatings for displays and monitors, photovoltaics, windows, and other applications where the maximum transmission of light is desired.

TABLE 1

| Example | Titania Sol (wt %) | Porosity Agent (wt %) | Transmission (visible %) | Ref$_{coating}$ (%) | Haze (%) |
| --- | --- | --- | --- | --- | --- |
| Comparative Example | 100 | 0 | 74.3 | 27.45 | 0.48 |
| Example 1 | 95 | 5 | 74.60 | 26.63 | 0.43 |
| Example 2 | 90 | 10 | 76.00 | 25.54 | 0.41 |
| Example 3 | 85 | 15 | 76.50 | 25.06 | 0.38 |
| Example 4 | 80 | 20 | 77.00 | 24.65 | 0.32 |

Figure 6:
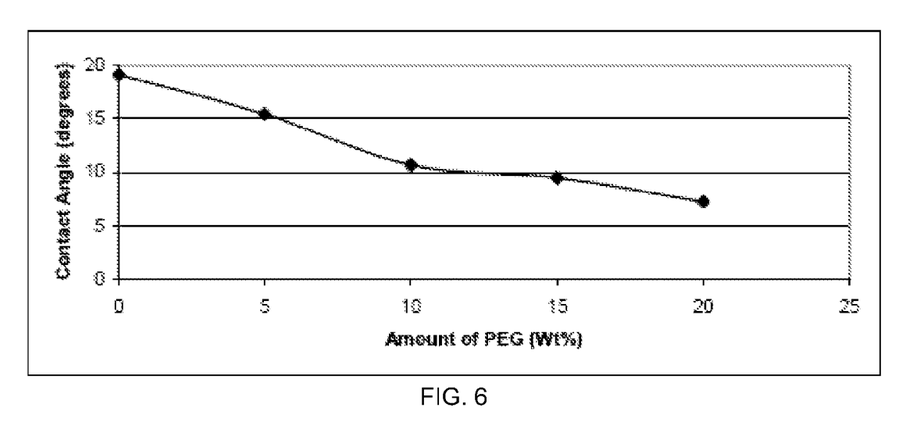
FIG. 6 is a graph of the water contact angle of exemplary porous anatase titanium dioxide coatings of the invention as a function of the amount of an exemplary porosity agent (PEG) contained in the sol-gel composition used to form the exemplary porous anatase titanium dioxide coatings.

The water contact angle as a function of the amount of PEG porosity agent in the sol-gel composition is shown in FIG. 6. As can be seen in FIG. 6, the water contact angle decreases as the amount of PEG in the sol-gel composition increases, which indicates that the porous titanium dioxide coating becomes more hydrophilic.

What is claimed is:

1. A method of forming a porous anatase titanium dioxide coating on a substrate, comprising:
   preparing a titanium dioxide sol-gel composition comprising at least one porosity agent;
   coating the substrate with the sol-gel composition; and
   removing the porosity agent;
   wherein the porosity agent is removed by heating the coated substrate at a temperature greater than about 600° C. to form the anatase titanium dioxide coating from the sol-gel composition;
   wherein the porosity agent is present in the sol-gel composition in an amount comprising at least 5 wt % of the total weight of the sol-gel composition.

2. The method of claim 1, wherein the substrate comprises a glass substrate.

3. The method of claim 2, wherein the glass substrate is chosen from clear or low-iron glass.

4. The method of claim 1, wherein the porosity agent is removed by heating the coated substrate at a temperature greater than about 625° C.

5. The method of claim 1, wherein the preparing of the titanium dioxide sol-gel composition includes preparing a sol-gel composition that comprises (1) a titanium alkoxide or a titanium chloride, and (2) the porosity agent.

6. The method of claim 1, wherein said porosity agent is polyethylene glycol.

7. The method of claim 6, wherein the polyethylene glycol is present in the sol-gel composition in an amount comprising at least about 10 wt % of the total weight of the sol-gel composition.

8. The method of claim 7, wherein the polyethylene glycol is present in the sol-gel composition in an amount comprising at least about 20 wt % of the total weight of the sol-gel composition.

9. A method of improving at least one of antimicrobial properties, self-cleaning properties, hydrophilicity, and temperability of a titanium dioxide coating, comprising:
   preparing a titanium dioxide sol-gel composition comprising at least one porosity agent;
   coating a substrate with the sol-gel composition; and
   heating the coated substrate to remove the porosity agent without forming rutile phase titanium dioxide;
   wherein the porosity agent is removed by heating the coated substrate at a temperature greater than about 600° C. to form an anatase titanium dioxide coating from the sol-gel composition;

wherein the porosity agent is present in the sol-gel composition in an amount comprising at least 5 wt % of the total weight of the sol-gel composition.

10. The method of claim 9, wherein said substrate is chosen from clear or low-iron glass.

11. The method of claim 9, wherein the anatase titanium dioxide coating is a pure anatase phase titanium dioxide coating.

12. The method of claim 9, wherein the preparing of the titanium dioxide sol-gel composition includes preparing a sol-gel composition that comprises (1) a titanium alkoxide or a titanium chloride, and (2) the porosity agent.

13. The method of claim 9, wherein the porosity agent is polyethylene glycol.

14. The method of claim 13, wherein the polyethylene glycol is present in the sol-gel composition in an amount comprising at least about 10 wt % of the total weight of the sol-gel composition.

15. The method of claim 14, wherein the polyethylene glycol is present in the sol-gel composition in an amount comprising at least about 20 wt % of the total weight of the sol-gel composition.

* * * * *